United States Patent Office 2,733,130
Patented Jan. 31, 1956

2,733,130

FERROUS GROUP METAL HEMICHROMITES AND THEIR PREPARATION

Herrick R. Arnold, Wilmington, Del., assignor to E. I. du Pont de Nemours and Company, Wilmington, Del., a corporation of Delaware No Drawing. Application November 5, 1953,
Serial No. 390,430

9 Claims. (Cl. 23—56)

This invention relates to new compositions of matter and to their preparation. More particularly, this invention relates to new ferrous metal chromium oxide compositions and to their preparation.

Hydrogenating metal chromites are a technically important class of heterogeneous catalysts, being highly selective for converting carboxylic compounds to the corresponding alcohols. U. S. Patent 1,746,782 describes various methods for preparing these chromites, including the spontaneous thermal decomposition of metal ammonium chromates. X-ray analyses of these metal chromites show line patterns identifiable with the metal chromites, $MCr_2O_4$.

An object of this invention is to provide new compositions of matter and methods for their preparation. A further object is to provide new ferrous metal chromium-oxide compositions and their preparation. Other objects will appear hereinafter.

These objects are accomplished in accordance with the present invention by providing the new compositions, ferrous group metal hemichromites, which correspond by analysis to the general formula $MCrO_2$ in which M is a metal of the ferrous group, i. e., nickel, cobalt and iron, and which are the products obtained by heating at 400° to 475° C. an intimate mixture of a ferrous group metal carboxylate with chromium trioxide, followed by reduction of the calcined product with hydrogen at 400° to 500° C. In these compositions the chromium is regarded as having an average valence of 2, and these new compositions are referred to as ferrous group metal hemichromites.

This new class of catalytically active materials has been found in the products obtained by intimately associating a ferrous group metal carboxylate with chromium trioxide, heating the mixture at 400° to 475° C. and after completion of the violent exothermic reaction which ensues holding the mixture at 400° C. for from 15 to 20 hours, followed by reduction of the calcined product by heating in a stream of hydrogen at a space velocity of at least 500 reciprocal hours at 400° to 500° C. for from 18 to 30 hours.

The examples which follow are submitted to illustrate and not to limit this invention.

EXAMPLE I

A solution containing 249 g. (1 mole) of $$Ni(C_2H_3O_2)_2.4H_2O$$

100 g. (1 mole) of $CrO_3$ and 1000 cc. of water is evaporated to dryness with stirring on a steam bath, and the friable, orange-red, solid is further dried at 120° C. The solid is then crushed to a powder and calcined in small portions in an open dish heated to between 400° and 450° C. The calcination reaction is violently exothermic and yields a finely divided, brown, free-flowing powder, which is further heated in an electric oven for 18 hours at 400° C. This product analyzes Ni, 36.7%; Cr, 33.3%; O, 30% (by difference). The calculated values for $NiCrO_3$ are Ni, 37%; Cr, 32.8%; O, 30.2%.

The calcination product, obtained as above, is reduced by heating at 450° C. for 24 hours in a stream of hydrogen flowing at a space velocity of 1000 reciprocal hours. Analysis of the reduced material shows it to contain Ni, 41.2%; Cr, 37.5%; O, 21.3%. The calculated values for $NiCrO_2$ are Ni, 41.1%; Cr, 36.5%; O, 22.4%.

The nickel hemichromite ($NiCrO_2$) is strongly ferromagnetic, is not pyrophoric at room temperature, and is essentially insoluble in dilute acids, e. g., hydrochloric acid. X-ray analysis shows a weak pattern of broad lines indicating small crystallites or amorphous material.

EXAMPLE II

A solution containing 249 g. (1 mole) of $$Co(C_2H_3O_2)_2.4H_2O$$

100 g. (1 mole) of chromium trioxide, and 1000 cc. of water is evaporated to dryness on a steam bath and the black, friable, product obtained is powdered and calcined in an open dish at 400° to 450° C., until decomposition is complete and then further heated in an electric furnace for 16 hours at 400° C. The calcination product is a dark green powder, which is essentially insoluble in acids. Analysis of the product shows it to contain Co, 38.1%; Cr, 32.9%; O, 29%. The calculated values for $CoCrO_3$ are Co, 37.1%; Cr, 32.7%; O, 30.2% (by difference).

The calcination product is reduced by heating in hydrogen at a space velocity of 1000 reciprocal hours at 400° C. for 16 hours, then at 450° C. for 4 hours, and finally at 475° C. for 5 hours. The reduced product analyzes Co, 39.2%; Cr, 33.9%; O, 26.9% (by difference). The calculated values for $CoCrO_2$ are Co, 41.2%; Cr, 36.3%; O, 22.5% and for $CoCrO_{2.5}$ they are Co, 39.1%; Cr, 34.4%; O, 26.5%. These analyses indicate that the $CoCrO_3$ was incompletely reduced and that the product is essentially a equimolar mixture of $CoCrO_3$ and $CoCrO_2$.

Substitution of iron acetate for the nickel or cobalt acetates in the above examples yields the corresponding iron hemichromite which can be represented by the formula $FeCrO_2$.

In place of the acetates, there may be used other ferrous group metal carboxylates, such as the propionates, oxalates, and the like. The ferrous group metal carboxylate and chromium trioxide are mixed in essentially equimolar proportions.

The calcination step is effected at temperatures of 400° to 475° C., depending upon the particular composition being calcined.

The reduction of the calcined composition is effected at temperatures of from 400° to 500° C. with hydrogen alone or with hydrogen diluted with an inert gas such as nitrogen. Generally, good reduction rates are achieved in the range of 425° to 475° C. and this embraces the conditions usually employed.

The reducing gas is passed over the heated calcined mixture at atmospheric pressure and a space velocity which is at least 500 reciprocal hours. Better results are generally obtained when the reducing gas is employed at a space velocity of 1000 to 2000 reciprocal hours and this therefore is the preferred method of operation. The time of reduction depends upon the composition of the reducing gas and the temperature used. Under preferred conditions of temperature and space velocity, the time of reduction will be between 18 and 30 hours.

The ferrous metal group hemichromites of this invention correspond by analyses essentially to $NiCrO_2$, $CoCrO_2$, and $FeCrO_2$.

The ferrous metal group hemichromites of this invention are useful catalysts for a variety of reactions such as hydrogenations, carbonylations, isomerizations, dehydrogenations, dehydrations, hydrogenolysis, etc. The versatility of these compositions is illustrated as follows:

Example A

A pressure reactor which has been flushed with a stream of nitrogen is charged with 96.08 g. (1 mole) of furfural and 10 g. of nickel hemichromite, prepared as described in Example I. The reactor is pressured to 600 atmospheres with hydrogen and shaken and heated at 120° to 170° C. for 1.5 hours. The temperature is then raised to 250° C. while maintaining the pressure at 600 atmospheres. These conditions are maintained for 2 hours. The reactor is permitted to cool, opened, and the contents discharged and filtered to remove the catalyst. From the filtrate, there is recovered tetrahydrofuran in 84% conversion.

Example B

A pressure reactor which has been flushed with nitrogen is charged with 108 g. (1 mole) of adiponitrile, 51 g. (3 moles) of ammonia, and 10 g. of nickel hemichromite, prepared as described in Example I. The reactor is pressured with hydrogen and shaken and heated at 123° to 138° C. for ¾ of an hour, during which time the pressure is increased from 450 to 700 atmospheres. The reactor is then permitted to cool, opened, and the contents discharged and filtered to remove the catalyst. There are recovered hexamethylenediamine in 60% conversion, hexamethyleneimine in 13% conversion, and a residue amounting to 8%.

Example C

Example B is repeated at 130° to 150° C. and 600 to 700 atmospheres pressure and a 6-hour reaction time, employing cobalt hemichromite, prepared as described in Example II, as the catalyst. Under these conditions hexamethylenediamine is recovered in 72% conversion, hexamethyleneimine in 4% conversion, and the residue amounts to 9%.

Example D

A pressure reactor which has been swept with nitrogen is charged with 99.09 g. (1.1 moles) of methyl glycolate and 4.5 g. of nickel hemichromite, prepared as described in Example I. The reactor is pressured with hydrogen to 200 atmospheres and shaken and heated at 270° C. for 5 hours. After cooling, the reactor is discharged and the contents filtered. Ethylene glycol is recovered in 10% conversion.

In addition to the above specific reactions, these ferrous group metal hemichromites catalyze the ammonia reduction of nitroaromatic compounds to the corresponding amines.

As many apparently widely different embodiments of this invention may be made without departing from the spirit and scope thereof, it is to be understood that this invention is not limited to the specific embodiments thereof except as defined in the appended claims.

I claim:

1. A ferrous group metal hemichromite corresponding by chemical analysis to the general formula $MCrO_2$ wherein M is a metal selected from the group consisting of nickel, cobalt and iron.

2. Nickel hemichromite corresponding by chemical analysis to the formula $NiCrO_2$.

3. Cobalt hemichromite corresponding by chemical analysis to the formula $CoCrO_2$.

4. Process for preparing a ferrous group metal hemichromite which comprises dissolving in aqueous solution essentially equimolar proportions of chromium trioxide and a ferrous group metal carboxylate wherein said ferrous group metal is selected from the class consisting of nickel, cobalt and iron, drying and calcining the precipitated product at a temperature of 400° to 475° C., then reducing in hydrogen said calcined product at a temperature of 400° to 500° C., and obtaining as the resulting product a ferrous group metal hemichromite.

5. Process for preparing a ferrous group metal hemichromite as set forth in claim 4 wherein said ferrous group metal carboxylate is a ferrous group metal acetate.

6. Process for preparing nickel hemichromite which comprises dissolving in aqueous solution essentially equimolar proportions of chromium trioxide and a nickel carboxylate, drying and calcining the precipitated product at a temperature of 400° to 475° C., then reducing in hydrogen said calcined product at a temperature of 400° to 500° C., and obtaining as the resulting product nickel hemichromite.

7. Process for preparing nickel hemichromite as set forth in claim 6 wherein said nickel carboxylate is nickel acetate.

8. Process for preparing cobalt hemichromite which comprises dissolving in aqueous solution essentially equimolar proportions of chromium trioxide and a cobalt carboxylate, drying and calcining the precipitated product at a temperature of 400° to 475° C., then reducing in hydrogen said calcined product at a temperature of 400° to 500° C., and obtaining as the resulting product cobalt hemichromite.

9. Process for preparing cobalt hemichromite as set forth in claim 8 wherein said cobalt carboxylate is cobalt acetate.

References Cited in the file of this patent
UNITED STATES PATENTS
2,435,551    Black _____ Feb. 3, 1948